US008991918B2

(12) United States Patent
Nakakita et al.

(10) Patent No.: US 8,991,918 B2
(45) Date of Patent: Mar. 31, 2015

(54) CHILD SEAT ATTACHMENT STRUCTURE

(71) Applicant: NHK Spring Co., Ltd., Yokohama (JP)

(72) Inventors: Takeshi Nakakita, Yokohama (JP);
Shoji Yamamoto, Yokohama (JP);
Yasuhiro Yamamoto, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 187 days.

(21) Appl. No.: 13/707,452

(22) Filed: Dec. 6, 2012

(65) Prior Publication Data

US 2013/0147246 A1 Jun. 13, 2013

(30) Foreign Application Priority Data

Dec. 7, 2011 (JP) ................................. 2011-268199
May 16, 2012 (JP) ................................. 2012-112194

(51) Int. Cl.
*B60N 2/28* (2006.01)
(52) U.S. Cl.
CPC .................................... *B60N 2/2893* (2013.01)
USPC ....................................... 297/253; 248/503.1
(58) Field of Classification Search
USPC ............ 297/253, 216.11, 452.18, 463.1, 464;
248/503.1; 296/68.1
See application file for complete search history.

(56) References Cited

U.S. PATENT DOCUMENTS

| 5,918,934 | A | * | 7/1999 | Siegrist | 297/250.1 |
| 6,030,046 | A | * | 2/2000 | Dorow | 297/464 |
| 6,361,115 | B1 | * | 3/2002 | Aufrere et al. | 297/452.18 |
| 6,634,710 | B1 | * | 10/2003 | Adamson et al. | 297/253 |
| 7,131,693 | B2 | * | 11/2006 | Smallwood et al. | 297/253 |
| 7,721,406 | B2 | * | 5/2010 | McCay | 29/509 |
| 2004/0080194 | A1 | * | 4/2004 | Medvecky et al. | 297/253 |
| 2004/0080195 | A1 | * | 4/2004 | Adams et al. | 297/253 |
| 2005/0168024 | A1 | * | 8/2005 | Duffy et al. | 297/253 |

FOREIGN PATENT DOCUMENTS

| JP | 2002-002348 | 1/2002 |
| JP | 2002-219976 | 8/2002 |
| JP | 2009-012552 | 1/2009 |
| JP | 2011-162059 | 8/2011 |

OTHER PUBLICATIONS

Office Action mailed Mar. 21, 2012 in Japanese Application No. 2011-268199.
Office Action mailed Jul. 3, 2012 in Japanese Application No. 2012-112194.

* cited by examiner

*Primary Examiner* — Milton Nelson, Jr.
(74) *Attorney, Agent, or Firm* — Knobbe Martens Olson & Bear LLP

(57) ABSTRACT

A child seat attachment structure comprising a lower anchor comprising a fixing portion that is fixed to a configuration member configuring a vehicle body or a vehicle seat, a leg portion that extends from the fixing portion towards a vehicle top side, and a coupling portion that is provided at an upper end portion of the leg portion and that fixes a child seat to the vehicle body or the vehicle seat by connecting to a connector of the child seat; and a contacted portion that restricts displacement of the coupling portion of the lower anchor towards a vehicle front side with respect to the fixing portion by making contact with a portion of the lower anchor when the child seat fixed to the vehicle body or the vehicle seat has moved towards the vehicle front side.

6 Claims, 3 Drawing Sheets

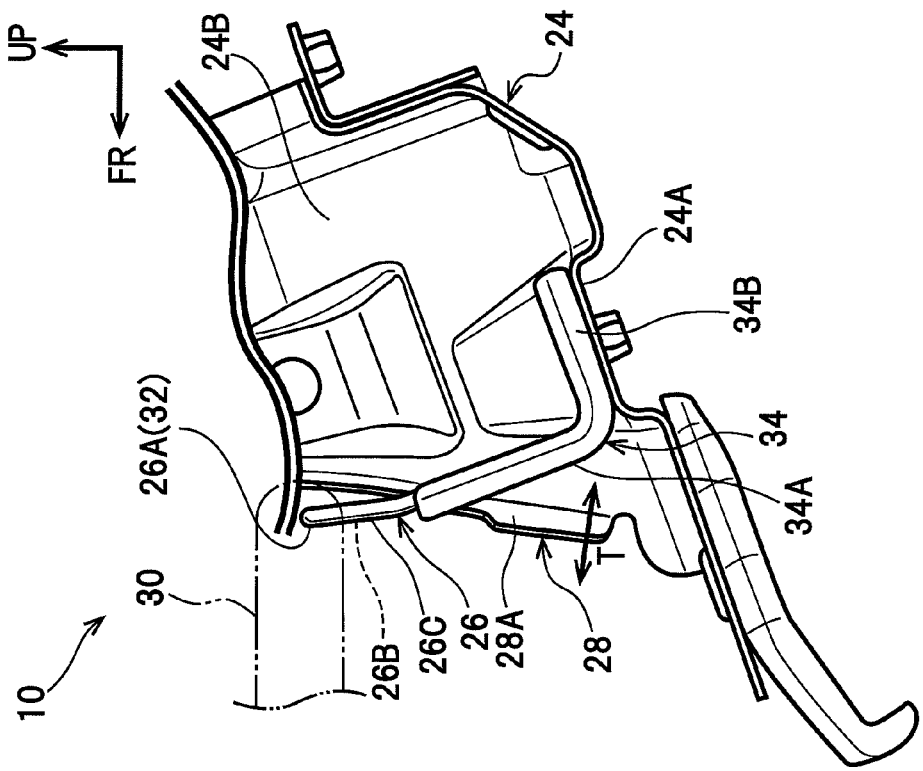

CHILD SEAT ATTACHMENT STRUCTURE

CROSS-REFERENCE TO RELATED APPLICATION

This application claims priorities under 35 USC 119 from Japanese Patent Applications, No. 2011-268199 filed on Dec. 7, 2011 and No. 2012-112194 filed on May 16, 2012, the disclosures of which are incorporated by reference herein.

BACKGROUND OF THE INVENTION

1. Technical Field

The present invention relates to a child seat attachment structure for attaching a child seat to a vehicle seat.

2. Related Art

Child seat attachment structures provided with a lower anchor for attaching a child seat to a vehicle seat are known. For example, Japanese Patent Application Laid-Open (JP-A) No. 2009-12552 discloses a child seat attachment structure provided with a lower anchor that is in compliance with ISOFIX, an ISO standard regarding methods for fixing child seats to vehicle seats (hereafter, referred to simply as "ISO-FIX").

However, if there is a large separation distance between a fixing portion of the lower anchor (an attachment portion of the lower anchor to a configuration member configuring the vehicle body or the vehicle seat) and a coupling portion of the lower anchor (a portion to which the child seat is fixed), it is conceivable that there could be a large amount of deformation of the lower anchor due to load input to the coupling portion from the child seat.

In consideration of the above circumstances, the present invention is directed towards obtaining a child seat attachment structure capable of suppressing deformation of the lower anchor due to load input to the coupling portion from the child seat.

SUMMARY

A child seat attachment structure of a first aspect of the present invention is equipped with: a lower anchor including a fixing portion that is fixed to a configuration member configuring a vehicle body or a vehicle seat, a leg portion that extends from the fixing portion towards the vehicle top side, and a coupling portion that is provided at an upper end portion of the leg portion and that fixes a child seat to the vehicle body or the vehicle seat by connecting to a connector of the child seat; and a contacted portion that restricts displacement of the coupling portion of the lower anchor towards the vehicle front side with respect to the fixing portion by making contact with a portion of the lower anchor when the child seat fixed to the vehicle body or the vehicle seat has moved towards the vehicle front side.

In the child seat attachment structure of the first aspect, a tension load towards the vehicle front side acts on the coupling portion of the lower anchor when the child seat fixed to the vehicle body or the vehicle seat moves towards the vehicle front side. As a result, the coupling portion of the lower anchor may deform so as to move towards the vehicle front side with respect to the fixing portion. When this occurs, a portion of the lower anchor contacts the contacted portion. As a result, further deformation of the lower anchor is restricted by the contacted portion.

A child seat attachment structure of a second aspect of the present invention is the child seat attachment structure of the first aspect wherein the contacted portion is formed by a portion of the configuration member configuring the vehicle body or the vehicle seat.

In the child seat attachment structure of the second aspect, there is no need to provide a dedicated member as a separate contacted portion since the contacted portion is formed by the portion of the configuration member configuring the vehicle body or the vehicle seat.

A child seat attachment structure of a third aspect of the present invention is the child seat attachment structure of the first aspect wherein the contacted portion is formed by a plate shaped flange extending from the configuration member configuring the vehicle body or the vehicle seat.

In the child seat attachment structure of the third aspect, there is no need to provide a dedicated member as a separate contacted portion since the contacted portion is formed by the plate shaped flange extending from the configuration member configuring the vehicle body or the vehicle seat.

A child seat attachment structure of a fourth aspect of the present invention is the child seat attachment structure of the third aspect wherein displacement of the coupling portion of the lower anchor towards the vehicle front side with respect to the fixing portion is restricted by a portion of the lower anchor which is configured to contact the flange from a different direction to the plate thickness direction of the flange.

In the child seat attachment structure of the fourth aspect, a portion of the lower anchor contacts the flange from a different direction to the plate thickness direction of the flange. The flange can accordingly bear load input from the portion of the lower anchor by distributing the load in the plate thickness direction of the flange and in a direction orthogonal to the plate thickness direction. As a result, the plate thickness of the flange can be reduced by appropriately setting the direction from which the portion of the lower anchor contacts the flange such that the set direction is within a range which is different from the plate thickness direction.

A child seat attachment structure of a fifth aspect of the present invention is the child seat attachment structure of any one of the first aspect to the fourth aspect wherein the lower anchor includes a pair of the leg portions disposed in the vehicle width direction, and the pair of leg portions are coupled together by a lower anchor bracket extending in the vehicle width direction.

In the child seat attachment structure of the fifth aspect, providing the lower anchor bracket of the above configuration allows load input to the coupling portion of the lower anchor to be borne distributed between the pair of leg portions.

A child seat attachment structure of a sixth aspect of the present invention is the child seat attachment structure of the third aspect, wherein an upper end portion of the plate shaped flange extends so as to approach the portion of the lower anchor more than a lower end portion of the flange.

In the child seat attachment structure of the sixth aspect, an upper end portion of the plate shaped flange extends so as to approach the portion of the lower anchor more than a lower end portion of the flange. The flange can accordingly bear load input from the portion of the lower anchor by distributing the load in the plate thickness direction of the flange and in a direction orthogonal to the plate thickness direction.

The child seat attachment structure of the first aspect exhibits the excellent advantageous effect of enabling deformation of the lower anchor due to load input to the coupling portion from the child seat to be suppressed.

The child seat attachment structures of the second aspect and the third aspect exhibit the excellent advantageous effect of enabling a saving to be made in the cost involved in providing the contacted portion.

The child seat attachment structure of the fourth aspect exhibits the excellent advantageous effect of enabling a reduction in the weight of the contacted portion to be achieved.

The child seat attachment structure of the fifth aspect exhibits the excellent advantageous effect of enabling the rigidity of the lower anchor to be enhanced.

BRIEF DESCRIPTION OF THE DRAWINGS

Embodiments of the present invention will be described in detail based on the following figures, wherein:

FIG. 3A is an enlarged side view illustrating a child seat attachment structure of the present exemplary embodiment; and FIG. 3B is an enlarged face-on view illustrating a child seat attachment structure of the present exemplary embodiment, as viewed from the vehicle front.

DETAILED DESCRIPTION OF THE INVENTION

Figure 1:
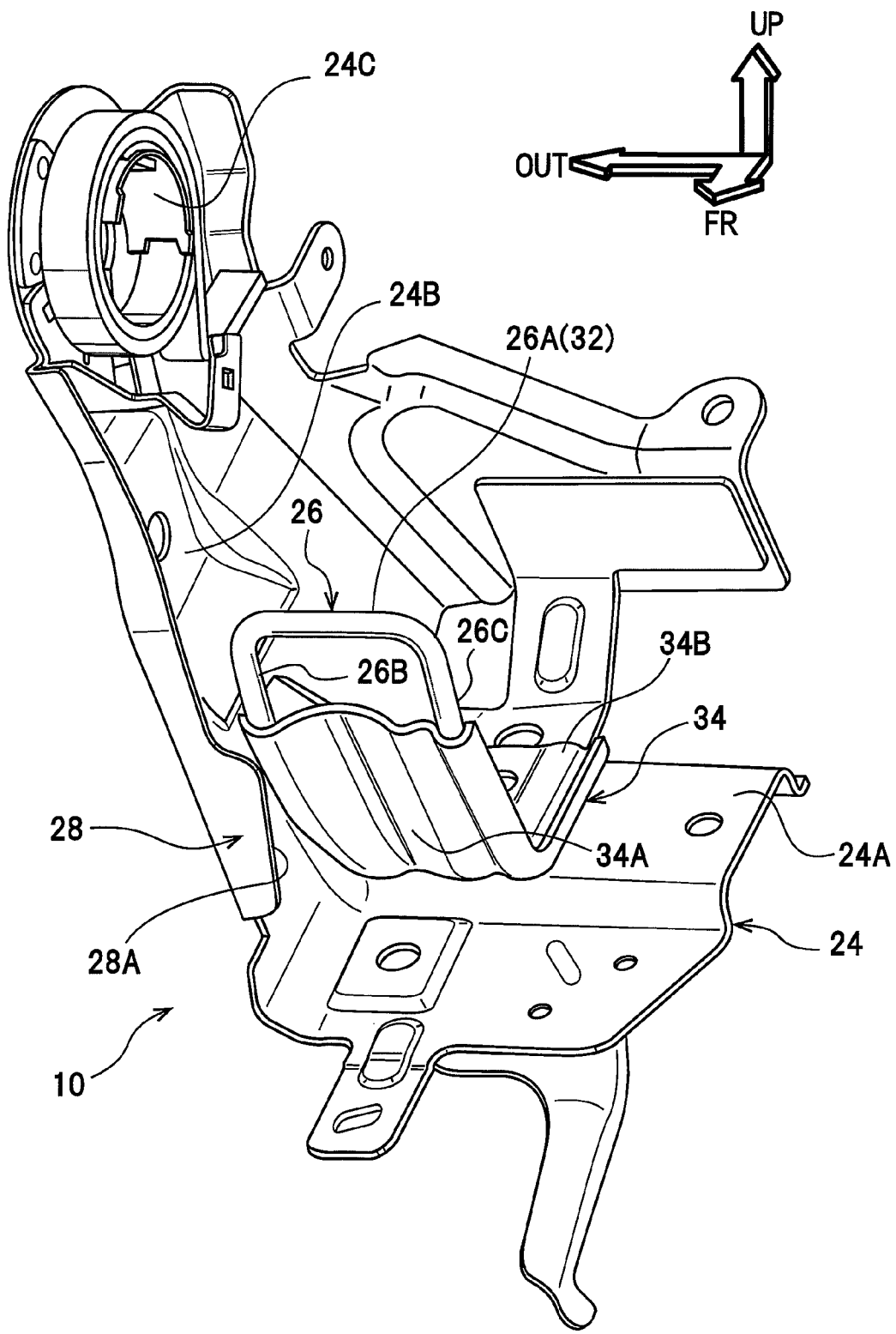
FIG. 1 is an enlarged perspective view illustrating a child seat attachment structure of a present exemplary embodiment.
Figure 2:
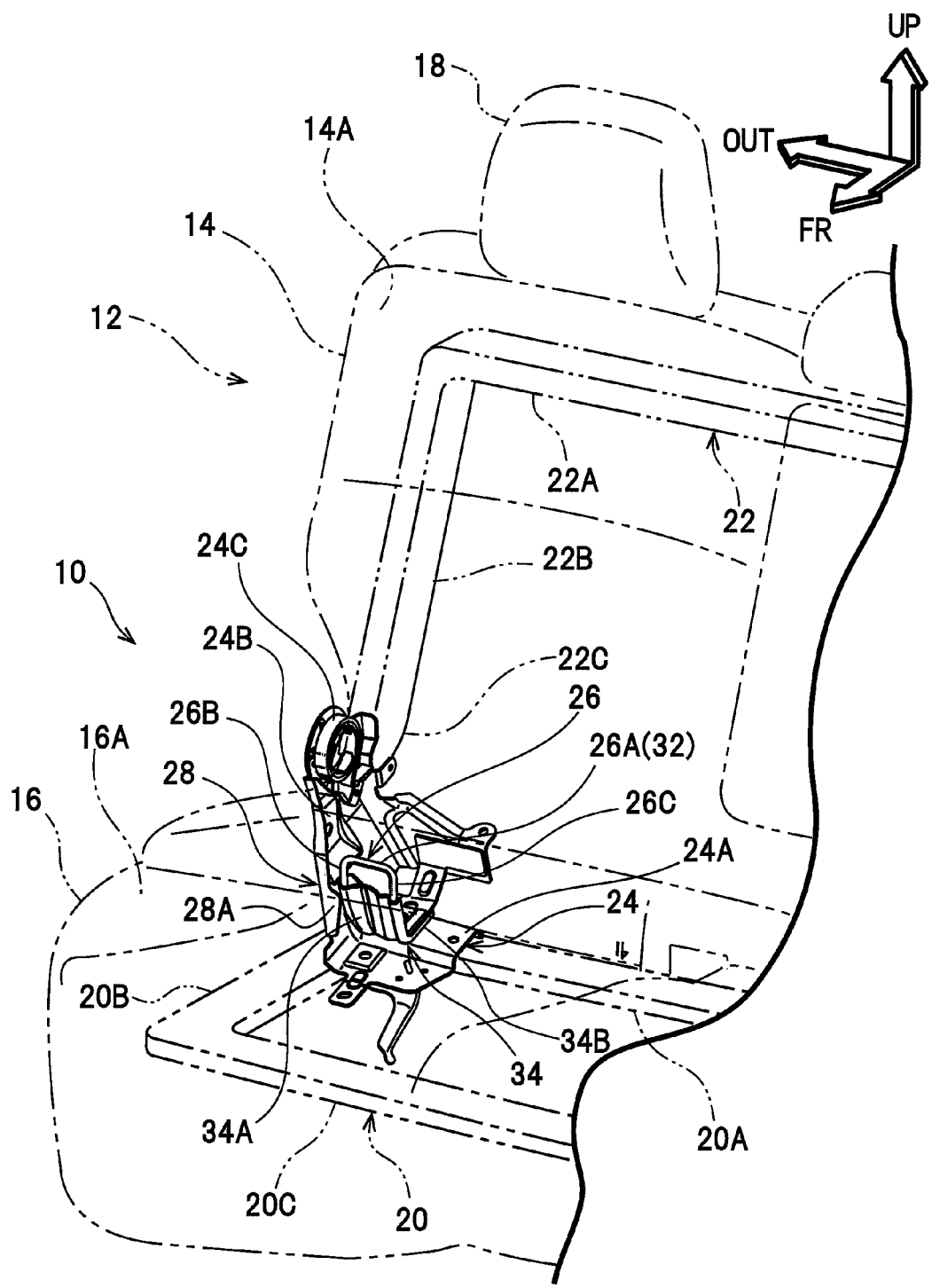
FIG. 2 is a perspective view illustrating a child seat attachment structure of the present exemplary embodiment.

Explanation follows regarding a child seat attachment structure according to an exemplary embodiment of the present invention, with reference to FIG. 1 to FIG. 3. Note that in the drawings an arrow FR indicates a vehicle front-rear direction front side, an arrow OUT indicates a vehicle width direction outside, and an arrow UP indicates a vehicle top-bottom direction top side. Unless specifically indicated, in the following explanation "front-rear" and "top-bottom" directions indicate front-rear in the vehicle front-rear direction and top-bottom in the vehicle top-bottom direction.

As shown in FIG. 2, a child seat attachment structure 10 of the present exemplary embodiment is applied to a rear seat 12 of a vehicle. The rear seat 12 is capable of sliding in the vehicle front-rear direction with a seat rail, not shown in the drawings, and a seatback 14 is configured so as to be capable of reclining with respect to a seat cushion 16. Explanation is first given regarding the rear seat 12 to which the child seat attachment structure 10 is applied, followed by explanation regarding the child seat attachment structure 10.

Rear Seat 12

The rear seat 12 is configured with principle elements including the seat cushion 16 on which an occupant sits, the seatback 14 that supports a back of the occupant seated on the seat cushion 16, and a headrest 18 that is attached above the seatback 14 and supports a head of the occupant.

The seat cushion 16 is provided with a seat cushion frame 20 forming a framework of the seat cushion 16. The seat cushion frame 20 is formed in a rectangular frame shape as viewed from above the vehicle, and is provided with a rear side frame 20A disposed at the vehicle rear side of the seat cushion 16 and extending in the vehicle width direction. A pair of lateral frames 20B extends towards the vehicle front side from both vehicle width direction outside end portions of the rear side frame 20A. A front side frame 20C connects together front end portions of the pair of lateral frames 20B in the vehicle width direction. Plural reinforcement members and seat cushion springs, not shown in the drawings, are also attached to the seat cushion frame 20. A seat cushion pad 16A formed for example from urethane foam is also attached to the seat cushion frame 20. The seat cushion pad 16A, together with the seat cushion springs, secures cushioning properties of the seat cushion 16, and forms the external shape of the seat cushion 16 itself. A covering material formed from for example fabric or leather is also attached to the seat cushion pad 16A.

The seatback 14 is provided with a seatback frame 22 forming a framework of the seatback 14. The seatback frame 22 is formed in an inverted substantially U-shape that is open towards the vehicle bottom side, and includes a top side frame 22A disposed at an upper portion of the seatback 14 and extending in the vehicle width direction, and a pair of lateral frames 22B extending from both vehicle width direction outside end portions of the top side frame 22A towards the vehicle bottom side. Lower end portions of the lateral frames 22B are formed with attachment portions 22C that are attached to side hinge brackets 24, described later. Plural reinforcement members and seatback springs, not shown in the drawings, are attached to the seatback frame 22, similarly to the seat cushion frame 20 above. A seatback pad 14A formed from for example urethane foam is also attached to the seatback frame 22, and a covering material is attached so as to cover the seatback pad 14A.

The side hinge brackets 24 are fixed to vehicle width direction outside end portions of the rear side frame 20A of the seat cushion frame 20. Each of the side hinge brackets 24 is provided with a base portion 24A that extends in the vehicle width direction and is fixed to the rear side frame 20A. A vehicle width direction outside end portion of the base portion 24A is provided with a side wall portion 24B that is bent around and extends towards the vehicle top side. An upper end portion of the side wall portion 24B is formed with an attached-to portion 24C, to which the attachment portion 22C of the seatback frame 22 is attached. Namely, the rear seat 12 is configured with the seatback 14 attached to a rear edge portion of the seat cushion 16 through the side hinge brackets 24.

Child Seat Attachment Structure 10

As shown in FIG. 1, the child seat attachment structure 10 is configured with principle elements including a lower anchor 26 that is attached to the side hinge bracket 24 and a flange 28 formed to the side hinge bracket 24.

The lower anchor 26 is formed by bending circular cross-section steel wire into a substantially inverted U-shape, opens towards the vehicle bottom side as viewed from the front of the vehicle. More specifically, the lower anchor 26 is provided with a first extension portion 26A extending in the vehicle width direction. The first extension portion 26A configures a coupling portion 32 to which a connector 30 (see FIG. 3B) of a child seat is coupled. The lower anchor 26 is further provided with a second extension portion 26B and a third extension portion 26C, serving as a pair of leg portions, that extend from both vehicle width direction end portions of the first extension portion 26A towards the vehicle bottom side and towards the vehicle rear side. Moreover, the second extension portion 26B and the third extension portion 26C of the lower anchor 26 are fixed to a lower anchor bracket 34. The lower anchor bracket 34 is formed in a substantially L-shape as viewed from the vehicle side, and is provided with a vertical wall portion 34A that connects the second extension portion 26B and the third extension portion 26C of the lower anchor 26 together in the vehicle width direction. The lower anchor bracket 34 is further provided with a fixing wall portion 34B, serving as a fixing portion, that extends from a lower end portion of the vertical wall portion 34A towards the vehicle rear side and is fixed to the base portion 24A of the side hinge bracket 24. Namely, the lower anchor 26 is fixed to the base portion 24A of the side hinge bracket 24 through the lower anchor bracket 34.

The flange 28, serving as a contacted portion, is integrally formed to the side hinge bracket 24. More specifically, the flange 28 is bent around to extend towards the vehicle width direction inside from a front end portion of the side wall portion 24B of the side hinge bracket 24. A projection portion 28A is further formed at a lower end portion of the flange 28 so as to extend projecting further towards the vehicle width direction inside.

As shown in FIG. 3A, in a state in which the lower anchor 26 is fixed to the base portion 24A of the side hinge bracket 24 through the lower anchor bracket 34, the projection portion 28A of the flange 28 is disposed so as to overlap along the vehicle front-rear direction with the second extension portion 26B of the lower anchor 26 and with a vehicle width direction outside end portion of the vertical wall portion 34A of the lower anchor bracket 34. Moreover, as shown in FIG. 3B, the projection portion 28A of the flange 28 extends to incline such that an upper end portion of the projection portion 28A approaches the second extension portion 26B of the lower anchor 26 and the vertical wall portion 34A of the lower anchor bracket 34.

Operation and Advantageous Effects of the Present Exemplary Embodiment Explanation is given next regarding operation and advantageous effects of the present exemplary embodiment.

As shown in FIG. 3B, in the child seat attachment structure 10 of the present exemplary embodiment, when a child seat, not shown in the drawings, that is fixed to the rear seat 12 moves towards the vehicle front side, a tension load towards the vehicle front side acts on the coupling portion 32 (the first extension portion 26A) of lower anchor 26. Namely, the coupling portion 32 of the lower anchor 26 is pulled by the connector 30 of the child seat. As a result, the lower anchor 26 deforms such that the coupling portion 32 (the first extension portion 26A) of the lower anchor 26 moves towards the vehicle front side with respect to the fixing wall portion 34B of the lower anchor bracket 34. When this occurs, the second extension portion 26B of the lower anchor 26 contacts the projection portion 28A of the flange 28 through a vehicle width direction outside end portion of the vertical wall portion 34A of the lower anchor bracket 34. Namely, in the child seat attachment structure 10, deformation of the lower anchor 26 due to load input to the coupling portion 32 from the child seat can be suppressed.

Further, in the child seat attachment structure 10, the contacted portion which is contacted by the second extension portion 26B of the lower anchor 26 through the vertical wall portion 34A of the lower anchor bracket 34 is formed by the flange 28 and the projection portion 28A that extend from the side wall portion 24B of the side hinge bracket 24 configuring the rear seat 12. Accordingly, in the present exemplary embodiment, there is no need to include a dedicated member in order to provide the contacted portion. Namely in the present exemplary embodiment, a saving can be made in the cost involved in providing the contacted portion.

In the child seat attachment structure 10, the flange 28 and the projection portion 28A extend to be inclined such that the upper end portion of the projection portion 28A approaches the second extension portion 26B of the lower anchor 26 and the vertical wall portion 34A of the lower anchor bracket 34. When the child seat moves towards the vehicle front side, the second extension portion 26B of the lower anchor 26 accordingly contacts the projection portion 28A from a direction that is a different direction to the plate thickness direction (the arrow T direction in FIG. 3) of the flange 28 and the projection portion 28A. The flange 28 and the projection portion 28A formed thereto are accordingly able to bear load input from the second extension portion 26B of the lower anchor 26 such that the load is distributed in the plate thickness direction and in a direction orthogonal to the plate thickness direction of the flange 28 and the projection portion 28A formed thereto. In the present exemplary embodiment the plate thickness of the flange 28 and the projection portion 28A can be reduced as a result. Namely, in the present exemplary embodiment a reduction in weight can be achieved for the flange 28 and the projection portion 28A forming the contacted portion.

In the child seat attachment structure 10, the second extension portion 26B and the third extension portion 26C of the lower anchor 26 are connected in the vehicle width direction by the vertical wall portion 34A of the lower anchor bracket 34. Accordingly, load input to the coupling portion 32 (the first extension portion 26A) of the lower anchor 26 can be borne distributed between the second extension portion 26B and the third extension portion 26C.

Note that whereas in the present exemplary embodiment explanation has been given of an example wherein the lower anchor 26 is fixed to the side hinge bracket 24 configuring the rear seat 12, the present invention is not limited thereto. For example, configuration may be made wherein the side hinge bracket 24 is fixed to a floor panel configuring a vehicle body. The fixing location of the lower anchor 26 may accordingly be appropriately set in consideration of such factors as the attachment structure of the vehicle seat to the vehicle body.

Whereas in the present exemplary embodiment explanation has been given of an example wherein the flange 28 serving as the contacted portion is integrally formed to the side hinge bracket 24, the present invention is not limited thereto. For example, configuration may be made wherein a dedicated member serving as the contacted portion is separately provided to a member configuring the vehicle body or the vehicle seat.

Moreover, whereas in the present exemplary embodiment explanation has been given of an example wherein the second extension portion 26B and the third extension portion 26C of the lower anchor 26 are coupled together in the vehicle width direction by the vertical wall portion 34A of the lower anchor bracket 34, and the lower anchor 26 is fixed to the side hinge bracket 24 through the lower anchor bracket 34, the present invention is not limited thereto. For example, configuration may be made wherein a lower end portion of the lower anchor 26 is directly fixed to the side hinge bracket 24 and the lower anchor bracket 34 is not provided. The provision or otherwise of the lower anchor bracket 34 may be appropriately set in consideration of such factors as the rigidity of the lower anchor 26.

Explanation has been given above regarding an exemplary embodiment of the present invention, however the present invention is not limited by the above and obviously various modifications other than those mentioned above may be implemented within a range not departing from the spirit of the present invention.

What is claimed is:
1. A child seat attachment structure comprising:
a lower anchor bracket comprising a fixing portion that is fixed to a configuration member configuring a vehicle body or a vehicle seat,
a lower anchor comprising a leg portion that extends from the fixing portion towards a vehicle top side, and a coupling portion that is provided at an upper end portion of the leg portion and that fixes a child seat to the vehicle body or the vehicle seat by connecting to a connector of the child seat; and a contacted portion that restricts displacement of the coupling portion of the lower anchor towards a vehicle front side with respect to the fixing portion by making contact with a portion of the lower anchor when the child seat fixed to the vehicle body or the vehicle seat has moved towards the vehicle front side.

2. The child seat attachment structure of claim 1, wherein the contacted portion is formed by a portion of the configuration member configuring the vehicle body or the vehicle seat.

3. The child seat attachment structure of claim 1, wherein the lower anchor comprises a pair of the leg portions disposed in a vehicle width direction, and the pair of leg portions are coupled together by a lower anchor bracket extending in the vehicle width direction.

4. The child seat attachment structure of claim 1, wherein the contacted portion is formed by a plate shaped flange extending from the configuration member configuring the vehicle body or the vehicle seat.

5. The child seat attachment structure of claim 4, wherein displacement of the coupling portion of the lower anchor towards the vehicle front side with respect to the fixing portion is restricted by a portion of the lower anchor which is configured to contact the flange from a different direction from a plate thickness direction of the flange.

6. The child seat attachment structure of claim 4, wherein an upper end portion of the plate shaped flange extends so as to approach closer to the portion of the lower anchor than a lower end portion of the flange.

* * * * *